United States Patent [19]
Bender et al.

[11] Patent Number: 6,123,981
[45] Date of Patent: Sep. 26, 2000

[54] CONSERVATION OF ORTHOPHOSPHATE WASTE FOR PREPARING AN ANIMAL FEED SUPPLEMENT

[75] Inventors: Fredric Grant Bender, McMurray; John Toczek, McDonald, both of Pa.; William E. Swartz, Cranbury, N.J.

[73] Assignee: Rhodia Inc., Cranbury, N.J.

[21] Appl. No.: 07/966,783

[22] Filed: Oct. 27, 1992

[51] Int. Cl.⁷ ................................ A23L 1/00; A23L 3/34
[52] U.S. Cl. .................. 426/662; 426/443; 426/465; 426/635; 210/770
[58] Field of Search ..................... 426/635, 662, 426/64, 654, 443, 465; 210/406, 770

[56] References Cited

U.S. PATENT DOCUMENTS

| | | | |
|---|---|---|---|
| 2,940,938 | 6/1960 | Blinka ...................... | 252/309 |
| 3,330,619 | 7/1967 | Herbst ....................... | 23/107 |
| 3,412,671 | 11/1968 | Merlis ........................ | 99/234 |
| 3,961,096 | 6/1976 | Emanuel ................... | 426/644 |
| 4,160,041 | 7/1979 | Schroeder et al. ......... | 426/69 |
| 4,171,342 | 10/1979 | Hirko et al. ............... | 210/906 X |
| 4,383,847 | 5/1983 | Barber ........................ | 71/34 |
| 4,963,371 | 10/1990 | Miller ........................ | 426/520 X |
| 5,069,922 | 12/1991 | Brotsky et al. ............ | 426/332 |
| 5,143,739 | 9/1992 | Bender et al. ............. | 426/332 |

*Primary Examiner*—John Kim
*Attorney, Agent, or Firm*—Andrew M. Solomon

[57] ABSTRACT

Phosphate is recovered from waste. Trialkali metal orthophosphate used to reduce, remove or retard bacterial contamination during raw meat slaughter including poultry, fish and shellfish and red meat evisceration is recovered from an aqueous waste and recycled as a food additive for animal feed. The waste water containing the phosphate can be collected and mixed with offal during processing of the offal or may be concentrated and blended with the offal as feed for animals or may be reacted with an alkaline earth metal salt and concentrated and used as a calcium and phosphate supplement for animal feed. Trisodium orthophosphate is reacted with calcium chloride and the resulting precipitate removed from the aqueous stream by filtration or centrifugation or other means for separation. The precipitate is then added to offal during processing for animal feed or dried sterilized and sold as an animal feed mineral supplement.

17 Claims, No Drawings

CONSERVATION OF ORTHOPHOSPHATE WASTE FOR PREPARING AN ANIMAL FEED SUPPLEMENT

BACKGROUND OF THE INVENTION

1. Field of the Invention

This invention relates to the recovery of phosphate from waste and more particularly to the recovery of orthophosphate used to reduce bacterial contamination of raw meat during slaughter or evisceration.

Trialkali orthophosphate, used to reduce salmonella and other bacterial contamination during slaughter of animals is either mixed, with or without concentration, with other waste products such as offal and rendered or processed with heat to form an animal feed or other by-products. The orthophosphate is mixed with a stoichiometric excess of an alkaline earth salt and the precipitate slurry concentrated or not, then added to the rendering process. Alternatively the precipitate is filtered or otherwise concentrated as by centrifuge or the like, dried, sterilized and sold as an animal food supplement.

In either method, the nutritional value of the phosphate is recovered preventing contamination of the environment and yielding an economic source of phosphate for animals. Preferable, aqueous trialkali metal orthophosphate waste is reacted with an alkaline earth metal salt and the resulting alkaline earth phosphate precipitate recovered by either admixing with animal feed during processing or by recovery of the precipitate by filtration, centrifugation or the like. The precipitated phosphate, such as calcium phosphate is mixed with animal feed such as offal or sold separately to produce a source of inexpensive calcium and phosphate.

Alternatively the orthophosphate may be thickened with gum prior to addition to offal or may be solidified by addition of excessive alkaline earth metal oxide or hydroxide.

2. Description of the Prior Art

It is known to treat animal slaughter waste by rendering to recover economic animal feed and oils. See, for example, U.S. Pat. No. 3,961,096, to Emanuel which treats poultry waste and recovers solids for use as stock feed and a uric acid precipitate. See, U.S. Pat. No. 3,412,671, which discloses dry rendering of organic material such as offal and the like to recover a solid material and oil.

The reaction of a calcium salt and phosphate is also broadly known as well as means for recovering phosphate from waste ore streams. For example, U.S. Pat. No. 4,383,847 teaches recovery of phosphorous for use in fertilizers. Such recovered phosphate may be used as animal feed as disclosed in U.S. Pat. No. 253,330,619 which recovers alkali metal phosphate salts from an aqueous leach solution of soda roast ferrophosphorous with acids. The patent teaches reaction of the recovered alkali metal phosphate with an alkaline metal oxide or hydroxide in order to recover the alkali metal hydroxide for recycling to the soda roast operation and recover the alkaline earth metal phosphates for recycling to an electric furnace for further processing with elemental phosphorous and/or recovery of calcium phosphates as an animal feed supplement.

U.S. Pat. No. 2,940,938 teaches making colloidal suspensions of certain phosphates for use as detergency builders.

SUMMARY OF THE PRESENT INVENTION

In the process of reducing, removing or retarding bacterial contamination and/or growth during slaughter of animals by treatment with trialkali metal orthophosphate at a concentration of from 2 to 40%, there is generated waste wash solution containing the orthophosphate which must be recovered. This is accomplished by either mixing the aqueous trialkali metal phosphate with other animal waste from the slaughter such as offal including animal bones, meat, fat, feathers, fins, shells, skin and the like and rendering the mixture by disintegrating the mixture to particulates and cooking or heating the mixture to render out oil and recover a solid which when dehydrated can be used as animal feed. The orthophosphate waste can be added directly to the offal to provide an economic source of phosphate and gums may be added to the waste orthophosphate solutions to aid transportation to the offal processing plant. The removal of water can occur during the normal rendering process or the waste orthophosphate can be concentrated prior to addition. The concentration can be accomplished by simply evaporating the waste to remove water and concentrate the orthophosphate waste or by chemically precipitating the orthophosphate with alkaline earth metal salts and separating the precipitate from the waste water by filtration, centrifugation or other separation means. Rather than rendering the offal and concentrate, the concentrate may be further dried in a kiln or suitable drier to produce a sterile solid which can be utilized as a feed supplement.

The waste may also be blended with large amounts of alkaline earth metal oxides or hydroxides which are dried and reused to blend with more waste solutions and/or incorporated in animal feed.

Reaction of the trisodium orthophosphate with calcium chloride or other alkaline earth salt is particularly useful since a neutral, economic, feed supplement high in calcium and phosphate is obtained. Filtration of the precipitated alkaline earth phosphate using waste feathers as a filter aid, is particularly preferred.

DETAILED DESCRIPTION OF THE INVENTION

In the treatment of animals during slaughter I have previously discovered that trialkali metal phosphate is effective in retarding, reducing or removing bacterial growth and/or contamination on the surface of the animal flesh during slaughter. In treating the animal flesh with a 1.5% to saturation, preferably 4% or more orthophosphate admixed with water I have reduced, removed or retarded substantially all the salmonella or bacteria content of poultry as disclosed in Ser. No. 530,131, now U.S. Pat. No. 15,069,922, issued Dec. 3, 1991 and Ser. No. 712,260, now U.S. Pat. No. 5,143,739, issued Sep. 1, 1992 and Ser. No. 938,864, certain bacteria in fish and shellfish as disclosed in Ser. No. 712,256, now abandoned and Ser. No. 931,264 and in red meat as disclosed in Ser. No. 712,245 and Ser. No. 931,138.

I have now discovered that I can conveniently recover the orthophosphate waste from these animal surface treatments and produce therefrom an animal feed supplement of economic and nutritional value.

In its broadest form, my invention involves simply recovering the aqueous orthophosphate mixture and admixing it with other animal waste from the slaughter and treating the mixture in art recognized fashion by rendering the waste or offal containing the phosphate to provide a solid feed supplement. Gums may be employed to aid this process. Alternatively I may concentrate the orthophosphate prior to its addition to the offal to be rendered by either evaporative concentration or preferably by precipitation and filtration using feathers or other filter aids. Finally, I may treat the concentrate with heat to dry and sterilize it to form a solid feed supplement which can be added to animal feed.

I prefer to chemically react the waste aqueous trialkali metal orthophosphate with an alkaline earth metal salt or mixture of salts to form an alkaline earth orthophosphate which precipitates from an aqueous media and which has both calcium and phosphate value to animals and which makes an excellent supplement to animal feed. The alkaline earth metal orthophosphate may be added to offal or other animal feed supplements either prior to or during or after treatment of such feed supplements. The alkaline earth metal orthophosphate can be added to offal and rendered to give a solid supplement or can be kilned to sterilize a dry phosphate feed additive. Animals which are treated by the orthophosphate and from whose slaughter operations I recover the waste orthophosphate includes poultry such as chicken and turkey, fish and shellfish and red meat such as beef, veal, pork and the like.

The alkaline earth metal salts used herein include calcium chloride, calcium nitrate, magnesium chloride and the like. Preferred is calcium chloride which is inexpensive and reacts well to form an insoluble calcium orthophosphate.

The alkaline earth oxides or hydroxide such as calcium hydroxide are alternatively used to bind small amounts of waste orthophosphate solution.

There follows a general process by which the waste orthophosphate can be recovered. Chicken is used to conveniently disclose the recovery. The trialkali metal orthophosphate is prepared with water at a orthophosphate concentration usually exceeding 4% and normally varying up to 12%. A concentration of 8 to 12% orthophosphate is conveniently used. Eviscerated poultry, either before or after cooling, is treated with the orthophosphate solution, pH 11.6 to 13.5, preferably 12.0 to 13.5 pH for 1 second to 15 minutes usually by dip or spray treatment of the entire surface area of the eviscerated poultry. The treatment is effective to reduce, retard or remove bacterial growth and/or contamination by bacteria especially salmonella. The treatment solution is filtered to remove slaughter waste solids. The concentration of orthophosphate treatment solution is maintained by periodically or continuously adding orthophosphate to the process. The solution is periodically or continuously replaced by fresh solution.

A continuous system can be employed where fresh and waste orthophosphate are simultaneously added and removed or the solution may be once used and recovered as waste. The waste treatment solution usually containing 4 to 12% orthophosphate although the solution may contain from 1.5 to 40%, preferably 2 to 40% and more preferably 4% or more such as 4 to 40% and most preferably 8 to 12% trialkali metal orthophosphate, preferably trisodium orthophosphate.

The waste orthophosphate solution is collected usually about 3000 to 4000 lbs. of used solution for 80,000 birds eviscerated per day which also generates some 100,000 lbs of offal per day. Such offal includes water, blood, feathers, heads, viscera and the like. Both the waste solution and offal must be disposed of. The offal is rendered by conventional means. For example, the offal may be dewatered in a screen followed by the solid mass being cooked and/or dried in a suitable drier such as kiln or belt drier or the like.

My invention involves recovering the waste orthophosphate aqueous solution and either admixing it with the offal prior to, during or after rendering or treating the solution to concentrate it and form a solid sterile feed supplement either by drying to a mineral feed supplement or by adding to offal.

The waste orthophosphate can be concentrated by evaporation means, by chemical reaction or by other art recognized concentration techniques such as ion exchange or the like. Once concentrated the orthophosphate can again be added before, during or after offal treatment or dried per se and sterilized to form a feed supplement.

Whatever means is chosen, the phosphate provides an economic feed supplement and avoids the problem of pollution of natural water sources.

In one preferred embodiment the orthophosphate waste is collected and transported to the rendering operation with the offal either admixed there with or in separate tanks where it can be added to offal at the offal treatment plant.

In an alternative embodiment the 4,000 lbs. of waste trisodium orthophosphate solution containing 4 to 12% orthophosphate is concentrated by evaporating or chemical reaction with subsequent concentration of the precipitated solids. In a preferred embodiment the orthophosphate content of the waste solution is reacted with an excess mole weight of an alkaline earth metal salt, preferably calcium chloride. The calcium chloride is added directly to the waste solution and mixed well to dissolve causing immediate precipitation of alkaline earth metal orthophosphate particularly calcium orthophosphate. About 160 lbs. to 480 lbs. dry weight of calcium orthophosphate is recovered usually as a wet solid having a pH of 6 to 8 and a moisture content exceeding 50%, usually 60 to 90% water, and a solids content of from 5 to 50% usually 10 to 40% solids by weight. The calcium orthophosphate is next transported in wet or dry form to the offal treatment plant where it is added before, during or after rendering or heat treating the offal. The orthophosphate can also be introduced with a rotary kiln or other heated drier where the solids may be dehydrated and sterilized. The final product is a sterile dry calcium orthophosphate animal feed supplement which provides both calcium and phosphate nutrients of an inexpensive cost. The final content of orthophosphate in processed offal is about 0.1% to 1%, preferably about 0.2 to 0.5% on a dry basis.

In a preferred embodiment, waste trisodium orthophosphate treatment solution is reacted with calcium chloride to precipitate calcium phosphate. The solution with precipitate is filtered through a bed of poultry feathers from the evisceration operation. The clear fluid exiting the feathers is sent to waste and the solid calcium phosphate mixed with other offal and rendered with heat to a dry animal feed supplement.

In another embodiment, an alkaline earth metal oxide or hydroxide can be added to the trialkali metal orthophosphate. The alkaline earth metal oxide or hydroxide, such as calcium oxide or hydroxide is not soluble in the orthophosphate solution and tends to absorb the solution if a large excess is used, such as more than 50% by weight of the solution, usually 70 to 100% by weight or 5 to 10 times the orthophosphate content. This material can be dried and reused to recover more orthophosphate solution and/or added to animal feed.

In a further embodiment, a suspension of the orthophosphate and alkaline earth metal oxide or hydroxide can be treated with acid preferably an inorganic acid such as hydrochloric acid or sulfuric acid to lower the pH to about 1 or 2 and the orthophosphate recovered as an alkaline earth metal orthophosphate.

Neither of the previous treatments is particularly useful unless the offal or animal feed can tolerate a very basic or acidic phosphate supplement. Preferably, the salts of alkaline earth metals are used since neutral alkaline earth metal phosphate feed supplements are produced.

The trialkali metal orthophosphate solution may also be thickened with a suitable gum such as carrageenan, locust bean, guar, gelatin or the like. The gum can be applied to either solutions of the waste orthophosphate per se, or solutions that have been treated with an alkaline earth metal salt or oxide or hydroxide. Usually the gum is added prior to the chemical treatment.

The invention is further illustrated but not limited by the following examples.

EXAMPLE 1

Alkaline earth metals such as calcium chloride were reacted with 10% trisodium phosphate (TSP) solutions to remove the phosphate. This removal of phosphate from the waste treatment discharge is important because of environmental concerns with phosphorous content in the watershed.

Calcium chloride was chosen because of its relatively inexpensive price, and because the calcium ion in solution will cause the phosphate ion to chelate around it. The reaction is represented by the following generalized equation.

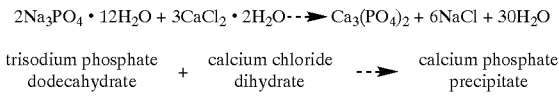

$$2Na_3PO_4 \cdot 12H_2O + 3CaCl_2 \cdot 2H_2O \dashrightarrow Ca_3(PO_4)_2 + 6NaCl + 30H_2O$$

trisodium phosphate dodecahydrate + calcium chloride dihydrate $\dashrightarrow$ calcium phosphate precipitate The resulting product, calcium phosphate, can be used as an ingredient in the rendering process. It is currently purchased for a nutritional supplement in feed where rendered material is used.

Other alkaline earth metal compounds were also successful in producing a phosphate precipitate from the TSP solution. These compounds were magnesium chloride and calcium nitrate. Therefore, it is clear that the alkaline earth metal compounds will aid in the removal by precipitation of phosphate from solution.

Chemically removing phosphates from the used trisodium phosphate solution is relatively easy and efficient. The Quimociac method of phosphate determination of brine was used throughout all the experimentation to determine the quantity of phosphate present in the effluent after the reaction took place.

The precipitated calcium phosphate is stirred in the treated solution and passed through a one foot bed of chicken feathers, recovered from the slaughter operation on a screen. The precipitated solids are separated and cling to the feathers and a clear watery substance recovered having less than 5% of its original orthophosphate content. The feathers are mixed with other offal usually feathers and processed to yield a feed supplement.

EXAMPLE 2

Solid anhydrous and dihydrate calcium chloride were added to a 10% trisodium phosphate solution. Also a 43% solution of dihydrate calcium chloride was used.

Results show that all forms of calcium chloride produced a precipitate that almost totally removed the phosphate from the solution.

EXAMPLE 3

20 grams of trisodium phosphate were dissolved in 180 grams of distilled water. To this solution various amounts of calcium chloride were added. The solution was agitated and then filtered to obtain a 25 milliliter aliquot. A phosphate assay was run to determine the concentration of TSP present.

The results show that 40 ml or 23 grams of dihydrate calcium chloride was sufficient in reducing the phosphate content in the effluent. This means that for every pound of trisodium phosphate in solution it will take 1.15 lbs of dihydrate calcium chloride to ensure an almost total, (less than 5%, preferably less than 1% phosphate remaining) of phosphate.

EXAMPLE 4

40 milliliters of dihydrate calcium chloride solution was added to 200 grams of 10% TSP solution. Then 200 grams of 10% TSP solution was added to 40 ml of dihydrate calcium chloride solution. Results show that the order of addition was of no significant importance because the amounts of phosphate found in the effluent were below 0.1 percent or a 99% recovery of phosphate from this waste solution.

EXAMPLE 5

A solution of 10 grams TSP and 90 grams distilled water was precipitated with 11.5 grams of dehydrate calcium chloride. This mixture was then subjected to a heat range from ambient temperature to 105° C. Results show that heat did not cause any noticeable decomposition of the precipitate.

EXAMPLE 6

After the chemical reaction in Example 5 had occurred, the pH of the effluent was taken.

Results show that the pH of the reacted material ranged from a pH 6 to 8. This relatively neutral substance is appealing to the renderers.

EXAMPLE 7

To 1 ml of 10% TSP solution, 4 drops of 43% $CaCl_2.2H_2O$ were added, mixed, and then subjected to 0.5 ml, 1.0 ml, 1.5 ml and 2.0 ml of 6M Acetic acid.

Results show that at equal amounts of precipitated solution and 6M acetic acid the precipitate dissolved. Therefore, a waste solution and fermented chicken parts were incorporated to observe the stability of the precipitate when in contact with acids from the chicken.

200 grams of waste 10% TSP solution was precipitated with 40 ml of dehydrated calcium chloride solution. Chicken parts were also added to observe stability of precipitate. Results show that a precipitate formed with the waste solution. This solution had a relatively low concentration of phosphate in the weep. Also, the precipitate seemed to harden after being stored with chicken parts for 3 days.

EXAMPLE 8

Various methods of agitation (stirring rod, magnetic stirrer, and air wand) were tested to determine whether mixing enhanced chemical reaction. Results show that all three methods of agitation were sufficient. The only concern is that adequate stirring be applied, usually until the solution turns a deep white color, to retain the solids in suspension until removal by filtration or centrifugation.

Filtering effects were observed during large and medium size trials. From these trials, samples were taken every hour and filtered with half the effluent through either fabric interfacing alone (coarse filter) or fabric interfacing with Baxter grade 371 fluted filter paper (fine filter) to observe differences between coarse and fine filter.

Results show that by filtering the phosphate through a fine filter it is evident that more phosphate was removed from the effluent.

After a precipitate was filtered for one hour through Baxter grade 371 fluted filter paper, tests were run to remove the bound moisture. The centrifuge, suction filter, stirring rod and air drying methods were all evaluated on their effect in removing water from the precipitate.

Air drying over 3 days removes more water from the calcium phosphate precipitate than the other methods. This is probably due to a surface to air relationship were the precipitate is spread thin instead of remaining in a filter. Centrifuging, stirring and suction filtering removed relatively the same amount of water from the precipitate. Air drying moisture content was around 40% of the precipitate while the moisture content for all other methods was 75 to 85%.

The solid is also easily removed employing feathers as the filter medium.

EXAMPLE 9

Calcium hydroxide, $Ca(OH)_2$, hydrated lime was evaluated in respect to its effect in the disposal of used trisodium orthophosphate solution. A saturated solution of calcium hydroxide 0.185 grams/100 cc was reacted with a 10% TSP solution and no precipitate was form using equal quantities of solution. The only noticeable effect was a slight cloudiness of the solution.

Various amounts of calcium hydroxide were added to 30 milliliters of 10% TSP in order to bind the solution. This addition of calcium hydroxide was carried out until a stable residue was formed; a form that seemed to bind all the solution.

| Calcium hydroxide Added | Physical Description |
| --- | --- |
| 70 g | pudding like texture |
| 75 g | semi-firm texture |
| 80 g | semi-firm texture |
| 85 g | firm claylike texture |
| 90 g | firm claylike texture |

The addition of dry calcium hydroxide to TSP solution had the effect of absorbing the liquid and solidifying it. The material is further processed by adding to offal. The material is also dried and then used to separate further orthophosphate from waste solution.

EXAMPLE 10

The use of guar gum was evaluated in disposing of a used 10% trisodium phosphate (TSP), solution. Guar is a binding agent that enhances the stability of a solution which will enable the used TSP solution to retain all the water without weeping. This method of water retention is conceptually similar to adding dry calcium hydroxide in the previous example. Therefore, several experiments were conducted to analyze the effects of guar addition.

20 grams of TSP were dissolved in 180 grams of distilled water. Then different ratios of calcium chloride and guar were mixed into the solution and allowed to filter for one hour. When guar was added to the used solution, a gelation of the solution occurred. The ratios of calcium chloride to guar and their relation to phosphate retention are found in the following table.

TABLE I

| Ml. $CaCl_2$/guar (%) | % TSP in Effluent |
| --- | --- |
| 40/0 | 0.0026 |
| 20/0 | 1.7 |
| 20/0.25 | 3.2 |
| 20/0.50 | 2.1 |
| 20/1.0 | 3.8 |

The second experiment was run to evaluate guar's ability to retain water. Different ratios of calcium chloride and guar were added to 200 grams of 10% TSP solution. These mixtures were stirred and allowed to sit for one hour. The results are shown in Table II.

TABLE II

| Ml. $CaCl_2$/guar (%) | Volume of Effluent |
| --- | --- |
| 40/0 | 85 |
| 20/0 | 65 |
| 20/0.25 | 59 |
| 20/0.5 | 35 |
| 20/1.0 | 10 |

It is noted that the order of addition is of importance. For example, if the guar is added to the 10% TSP solution before the calcium chloride then water is held in the precipitate.

In both experiments, calcium chloride was used as a control, and a basis to evaluate guar in relation to phosphate retention and binding ability. If guar was added directly to the TSP solution a gel formed. The first experiment reveals that 40 milliliters of calcium chloride had the best effect on removing the phosphate from solution. Experiments found the more guar added the less amount of water wept from the gel.

Guar possesses an exceptional ability to bind water into a gel and could be used to help transport and disperse trialkali metal orthophosphate to the rendering plant.

The simplest method to incorporate the used orthophosphate solution into the rendering process would be to transport the solution from the treatment tank to the offal processing area. An offal truck has a capacity of 40,000 lbs. Therefore, 3,000 to 4,000 lbs of used trisodium phosphate (TSP), solution can be filtered through the feathers and easily dispersed on the trucks.

The used TSP solution can also be transported separately to the rendering plants, and then sprayed into the offal before further processing.

While the introduction of waste TSP solution into rendering would be the cheapest and easiest method to incorporate TSP into offal, the alkalinity of the solution and its potential to saponify rendered material is overcome by reacting $CaCl_2$ or other alkaline earth salts with the orthophosphate to neutralize it prior to addition to the offal.

Rather than addition to offal, the used orthophosphate is reacted with slight excess of $CaCl_2$ and brought to pH 6 to 8. The solution is centrifuged or filtered and the wet cake dried in a kiln to recover a sterile feed additive high in calcium and phosphorous. Alternatively, the wet cake is dispersed with offal and rendered to animal feed.

What is claimed is:

1. A method of preparing an animal feed supplement comprising:

recovering a waste stream containing alkali metal orthophosphate;

subjecting the waste stream to heat sufficient to concentrate and/or sterilize the orthophosphate; and recovering the sterilized orthophosphate.

2. The method of claim 1 in which the orthophosphate is added to animal offal and rendered to yield a sterile solid containing the orthophosphate.

3. The method of claim 2 in which the orthophosphate is concentrated prior to adding to the offal and rendering.

4. The method of claim 3 in which the orthophosphate waste stream is evaporatively concentrated.

5. The method of claim 3 in which the orthophosphate waste is reacted with an alkaline earth metal salt and the resulting precipitate recovered as a concentrate.

6. The method of preparing an animal feed supplement comprising:

recovering a waste stream containing alkali metal orthophosphate;

concentrating said orthophosphate; and drying the concentrate at a temperature sufficient to form a solid.

7. The method of claim 6 in which the concentrate is prepared by reacting trialkali metal orthophosphate with an alkaline earth metal salt to form a precipitate and recovering the precipitate.

8. The method of claim 7 in which the precipitate is recovered by filtration.

9. The method of claim 7 in which the precipitate is recovered by centrifugation.

10. A method of preparing an animal feed supplement comprising:

treating animal flesh during slaughter with an aqueous mixture of 2 to 40% trialkali metal orthophosphate to retard, reduce or remove bacterial growth and/or contamination;

recovering the waste aqueous orthophosphate; and mixing the orthophosphate with other animal material to form an animal feed supplement.

11. The method of claim 10 which further includes:

admixing the waste orthophosphate with other animal slaughter waste;

rendering the waste mixture; and recovering a solid animal feed.

12. The method of claim 10 which further includes:

reacting the trialkali metal orthophosphate with an alkaline earth metal salt to form a precipitate.

13. The method of claim 12 in which the orthophosphate is trisodium phosphate and the alkaline earth metal salt is calcium chloride.

14. A method of preparing an animal feed supplement comprising:

treating animal flesh during slaughter with an aqueous mixture of 4 to 40% trialkali metal orthophosphate to retard, reduce or remove bacterial growth and/or contamination;

recovering the waste aqueous orthophosphate;

reacting the waste aqueous orthophosphate with an alkaline earth metal salt to form a precipitate; and concentrating the precipitate to form an animal feed supplement.

15. The method of claim 14 in which the orthophosphate is trisodium orthophosphate and the alkaline earth metal salt is calcium chloride.

16. The method of claim 6 in which an excess of an alkaline earth metal oxide or hydroxide is added to form a paste or solid which is dried.

17. The method of claim 6 in which the alkali metal phosphate is mixed with a gum to form a solid or semi-solid mass.

* * * * *